United States Patent [19]

Boodram

[11] Patent Number: 5,246,374
[45] Date of Patent: Sep. 21, 1993

[54] EXPANDABLE FAMILY TREE AND MODULAR KIT FOR BUILDING THE SAME

[76] Inventor: Alma Boodram, 4010 E. 10th Ave., Tampa, Fla. 33605

[21] Appl. No.: 886,055

[22] Filed: May 19, 1992

[51] Int. Cl.[5] .............................. A63B 22/04
[52] U.S. Cl. .................... 434/154; 434/430; 40/152
[58] Field of Search ............ 434/154, 369, 365, 430; 40/158.1, 124.2, 159, 152

[56] References Cited

U.S. PATENT DOCUMENTS

| | | | |
|---|---|---|---|
| 705,833 | 7/1902 | Gee | 434/154 |
| 1,297,663 | 3/1919 | Davis | 434/154 X |
| 2,593,195 | 4/1952 | Rosenberg et al. | 40/158.1 X |
| 4,375,288 | 3/1983 | Guerbin | 434/154 X |
| 4,483,680 | 11/1984 | Daly | 434/154 |
| 4,501,559 | 2/1985 | Griswold et al. | 434/154 |
| 4,650,422 | 3/1987 | Gorczynski | 434/154 |
| 4,794,716 | 1/1989 | George et al. | 40/158.1 |
| 4,865,548 | 9/1989 | Snyder | 434/154 |

Primary Examiner—Gene Mancene
Assistant Examiner—L. Thomas
Attorney, Agent, or Firm—Peter H. Rehm

[57] ABSTRACT

A kit, structure, and method for displaying pictures of related individuals or couples in a family tree according to actual family relationships The kit has at least one picture holder in the shape of a heart and several in the shape of leaves One or more branches are provided to connect the picture holders according to a structure suggested by family relationships. A heart shape around a picture represents marriage. A branch is extended from the heart shape if the marriage produced children. For each child of the marriage, a leaf picture holder is connected to the branch as if "growing" from it by a leafstalk. The marriage of a child is represented by an additional branch "grafted" into the child's leaf picture holder and an additional heart-shaped picture holder on that additional branch. If the child had children from this marriage, the additional branch extends beyond the additional heart and has additional leaf picture holders "growing" from it. This pattern continues for as many generations as desired. A trunk member may serve to connect the earliest ancestor(s) displayed with their several children via several limbs rather than a phyllotaxy of leaves around a single branch. A love knot picture holder may replace a heart-shaped picture holder wherever parents were not married. Special heart, leaf and love knot members which are not pictures holders may be used sparingly to represent actual individuals for whom no pictures are available. Alternative structures that may be practiced with the kit are disclosed.

20 Claims, 6 Drawing Sheets

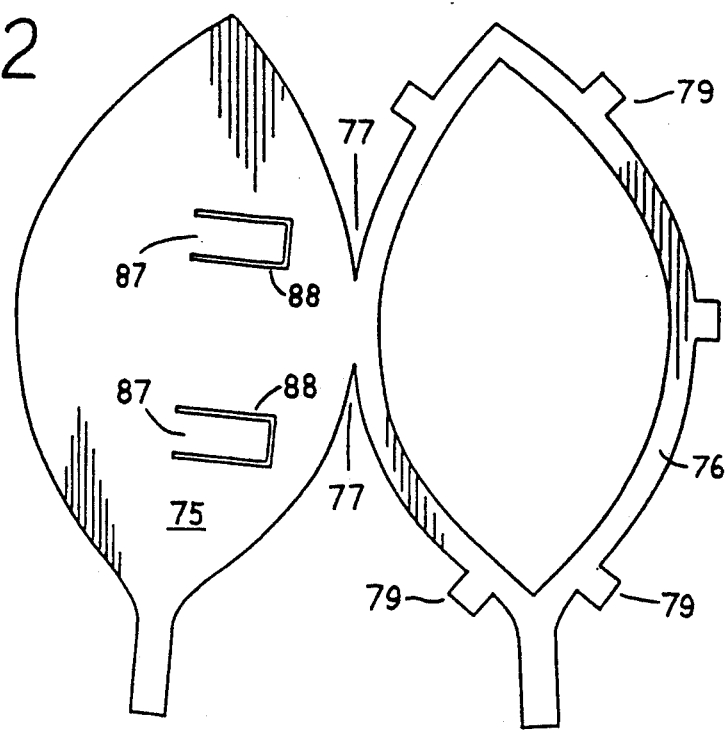
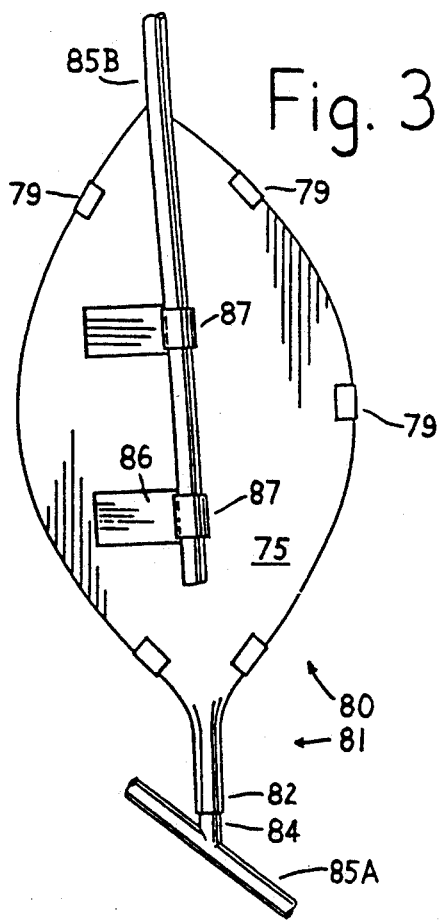
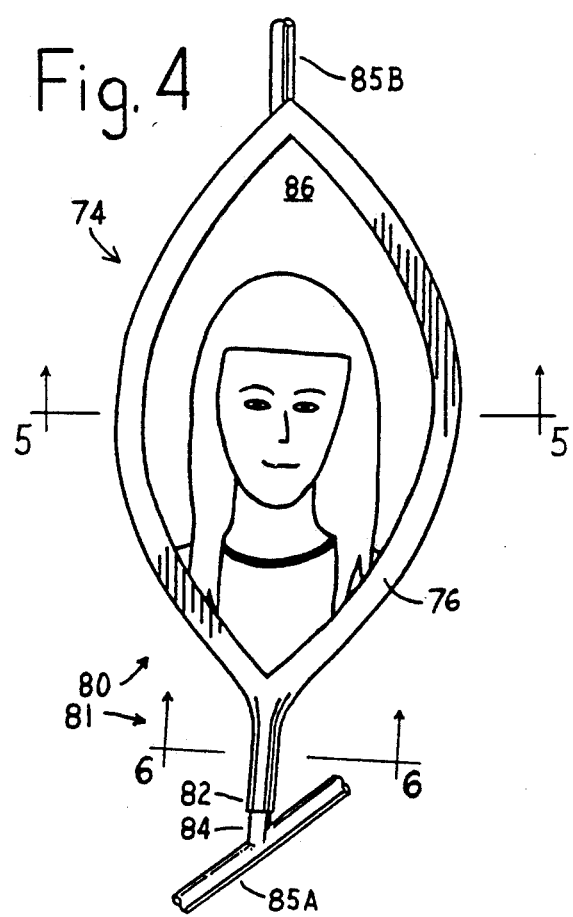

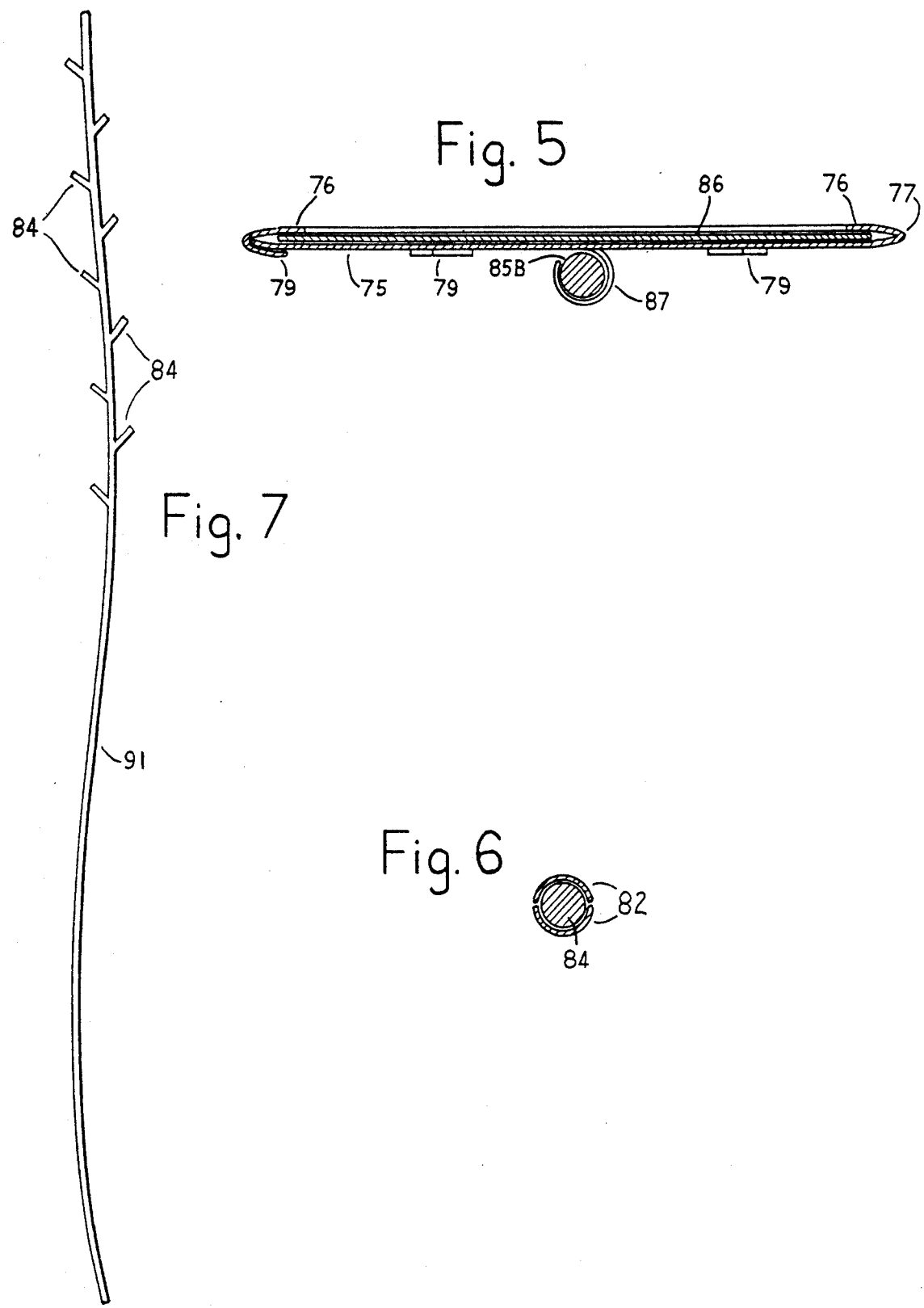

EXPANDABLE FAMILY TREE AND MODULAR KIT FOR BUILDING THE SAME

BACKGROUND OF THE INVENTION

1. Field of Invention

This invention relates generally to decorative and educational displays and specifically to modular genealogical or family tree display kits having frames for photographs or other likenesses of family members.

2. Related Art

Many people compile genealogical information to record and understand their roots. This information is taught to children to help them understand their of family identity. Family members who are living are known to children by their relationships. It takes time for children and others to develop a clear mental picture of the relationships of many relatives. This is one reason so many devices and methods for recording, displaying, teaching, and aids to understand genealogy or family relationships have been invented.

Genealogical charts show ancestors or descendants who are identified by name and other data in a structure that shows their family relationships. Such charts are useful for research and record keeping. Examples are U.S. Pat. No. 1,297,663 to Davis, and U.S. Pat. No. 4,483,680 to Daly, U.S. Pat. No. 4,501,559 to Griswald et al, and common pedigree charts.

Plaques having printed or engraved names are useful for displaying genealogical or family tree information, as can be seen in U.S. Pat. No. Des. 265,643 to Smith.

Some multiple photograph picture frames have a family tree theme. Sometimes this theme is expressed in the name only, such as "Family Tree Picture Holder," U.S. Pat. Des. 285,751 to Timarac. Sometimes it is expressed by the presence of an ornamental tree, such as in "Picture Frame," U.S. Pat. No. Des. 270,882 to Wilson. Neither of these shows the relationships of the family members.

Some genealogical or family tree games have related displays. U.S. Pat. Nos. 4,375,288, Des. 276,055 and Des. 273,312, all to Guertin, are directed to a game that teaches genealogical research methods while players place likenesses of persons on an ornamental tree. Some games are intended to familiarize children with older members of their families.

Some genealogical displays are modular. In U.S. Pat. No. 705,833 to Gee, record elements bearing names are loosely linked to create a Genealogical Chain Record. U.S. Pat. No. 4,650,422 to Gorezynski shows a family tree doll set in which dolls representing various generations of a family occupy tree swings or tree houses in a tree. U.S. Pat. No. 4,865,548 to Snyder teaches a three dimensional display capable of showing or representing lateral family relationships such as aunts, uncles, and cousins using markers bearing names. French Pat. No. 1,195,038 shows a modular construction in which vertical members represent the males of a family and oblique members represent the females. Gee and the French patent suggest that pictures can accompany the modular elements. A "Heritage Tree" having modular apple-shaped picture frames was advertised as "perfect for the family tree".

As can be seen from the genealogical inventions above, there is considerable interest in providing ways of recording, teaching, and displaying genealogical information to preserve and strengthen family bonds. However, whatever the precise advantages or attributes of the above mentioned genealogical and family tree displays, none of them achieves or fulfills the purposes of the present invention as defined by the following objectives, disclosure and claims.

OBJECTS AND SUMMARY OF THE INVENTION

1. Objects

A first object of the current invention is to provide a kit of picture frames capable of displaying family relationships according to a particular family's genealogy or family tree. It should therefore be able to display any number of generations and be expandable to accommodate growth of the family through marriages and births. It is an object of the invention that the display structure be able to display relationships involving children of a single parent. And it is an object of the invention that these other objects be met with a structure generally retaining the metaphor of a natural tree.

It is a further object to provide a structure which can accommodate the fact that a photograph might not be available for every family member and to provide an inconspicuous and understandable alternative to a photograph, should it occasionally be necessary. In addition to the case when a photograph is not available, it is an object of the invention to provide a way to use the photographs that are readily available, whether they be of individuals or couples, without always requiring that new photographs be taken.

Another object of the invention is that the same basic kit can also be assembled into an alternative structure, one which displays a number of photographs of one child at various stages of growth, including marriage.

2. Summary

The above objects and more are met by providing a genealogical display having the metaphor of a natural tree, with several unique changes that enable the structure to reveal family relationships for any number of generations.

The invention is provided as a set of interconnectable cooperating parts. The basic kit contains at least one heart-shaped picture holder (a heart), an elongated member roughly simulative of a branch of a tree (a branch), and several leaf picture holders (leaves). The branch attaches to the back of the heart-shaped picture holder by a secure means of attachment. The leaf picture holders each have a blade and a leafstalk. The blade portion holds a picture and the leafstalk has a branch connector that connects selectively along the length of the branch. This basic kit is sufficient to display a nuclear family (father, mother, and their children) according to the invention.

According to the structure of the invention, the hearts and leaves are organized by generations according to the following basic principles. A heart represents marriage. The heart frame holds a picture of a married person alone or with his or her spouse. A branch mounted to the heart extends or "grows" out of the heart, preferably near the top (inner facing point) of the heart. The children of this marriage are each represented by a leaf growing from the branch in a phyllotaxy, which is an arrangement of leaves on a branch. The "branch" is any elongated member connecting various picture frames. For convenience, the branches preferably have a number of spaced attachment points for attaching the leafstalks of leaves.

Additional pieces can be added to develop more complicated structures. A kit for practicing the most advanced features of the invention includes, on at least some of the leaves, means for mounting a second branch to the leaf. This second branch is not mounted on the leafstalk. Instead, it is mounted to the back of the blade of the leaf, as if grafted into the leaf. (Preferably, all the leaves have this feature. If nothing else, it provides for growth.) The basic nuclear family display is extended as follows: If a child is represented by a leaf and is married, a new branch is grafted into the blade of this leaf. A new heart representing the child's marriage is mounted on the new branch. If this marriage resulted in any children, the new branch is extended beyond the periphery of the new heart. Another phyllotaxy of leaves about this extension of the new branch represents the children of the marriage. Thus, additional generations are represented by repeating the nuclear family structure or portions of it where necessary. The nuclear family structures are attached to each other according to family relationships.

To provide a stronger metaphor of a tree, the first two generations may be connected to a trunk simulative of a tree trunk. The first generation couple is pictured in a heart-shaped picture frame at the root of the tree trunk. Each second generation child is represented by a picture frame mounted on a separate branch or limb that grows out of the top of the trunk. Thus, the second generation can be an exception to the "phyllotaxy about a common branch" arrangement. Each second generation parent is represented by a heart which is both mounted on a limb and is part of a nuclear family display. An optional love knot picture holder is also provided. It is structured like a heart-shaped picture holder except for shape. It represents unmarried parents, and may substitute for a heart-shaped picture holder wherever required.

The basic kit can also be used in alternative ways and structures. One alternative structure is to use the kit to display as leaves several photographs of the same child at different ages, with the heart-shaped picture holder at the top representing marriage. The kit is flexible enough for users to create their own novel structures.

BRIEF DESCRIPTION OF THE DRAWINGS

FIG. 2 is leaf picture holder open flat as provided, according to one embodiment of the invention.

FIG. 3 is a rear view of the leaf picture holder of FIG. 2, folded, with two branches attached, and holding a user-provided picture.

FIG. 4 is a front view of the leaf picture holder of FIG. 3.

FIG. 5 is an enlarged section view taken from FIG. 4 along the line 5—5.

FIG. 6 is an enlarged section view taken from FIG. 4 along the line 6—6.

FIG. 7 is a branch of a typical length, according to one embodiment of the invention.

DESCRIPTION OF THE PREFERRED EMBODIMENTS

Figure 1:
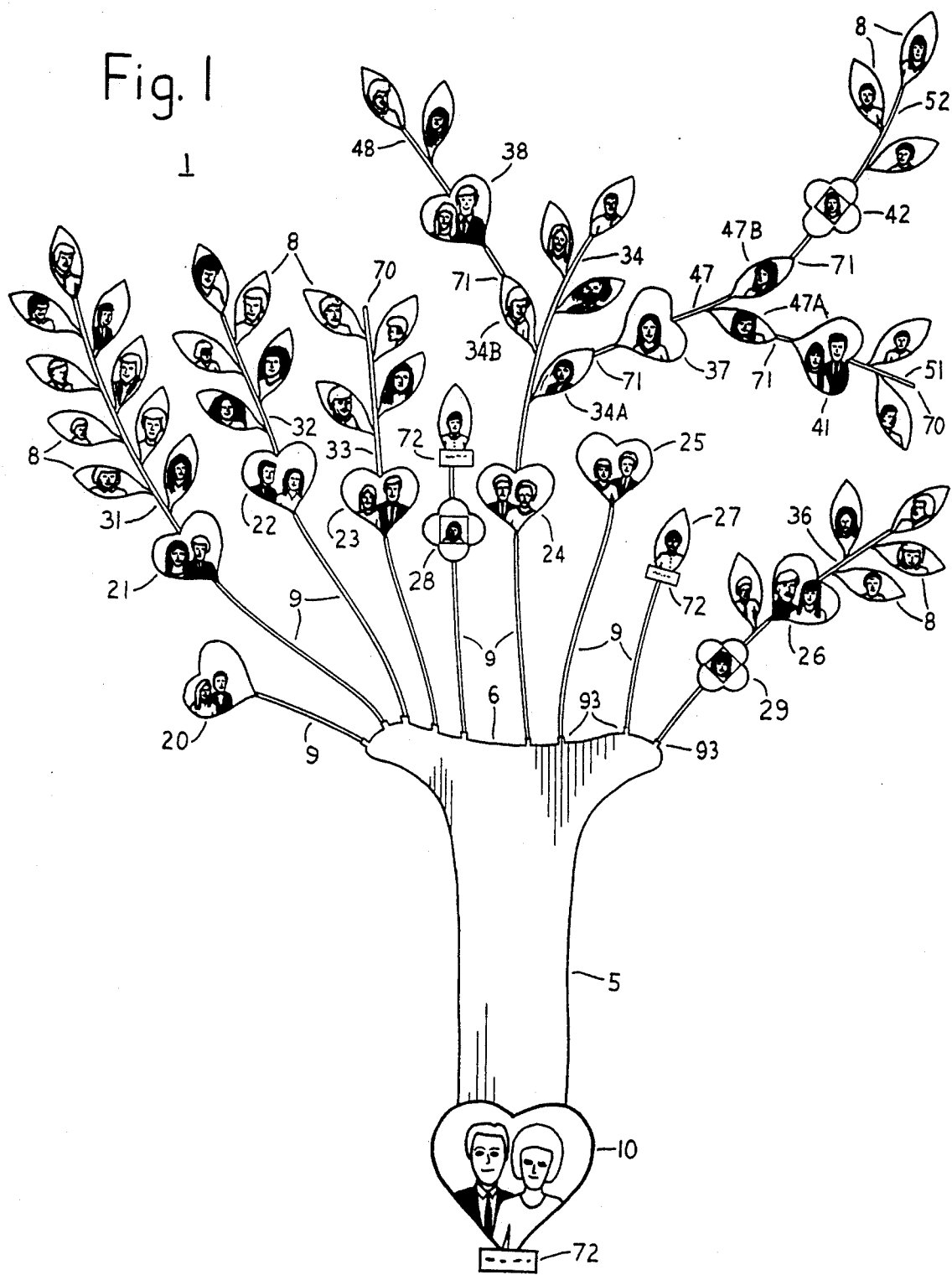
FIG. 1 is an elevation view of the invention as illustratively assembled for a particular family, according to one embodiment of the invention.

A family tree structure 1 prepared according to one preferred embodiment of the invention is shown illustratively in FIG. 1. The structure 1 includes several kinds of parts. The trunk 5 is simulative of a tree trunk. At the root area of the trunk 5 is a senior heart-shaped picture holder 10. The structure 1 has a number of other heart-shaped picture holders 20-26, 37-38, 41, which are also called hearts. The structure 1 also has a number of leaf picture holders 8, or leaves. The hearts and leaves are connected to each other and the trunk 5 by a number of branches 31-34, 36, 47-48, 51-52. If a branch is connected directly to the trunk 5, the part of the branch between the trunk and the first picture frame is also called a limb 9, as shown in branches 31-34 and 36. The pictures shown in FIG. 1 are provided by the user.

The various parts of the invention are to be provided both as a kit of several cooperating pieces and as individual pieces to supplement the kit. An important objective of the invention is to provide a basic kit for starting on a small scale and permitting expansion later with additional matching parts. The basic kit therefore provides only enough parts for a nuclear family, namely a father, mother, and their direct offspring. One heart-shaped picture holder, one branch, and a reasonable number of leaf picture holders (at least two) is sufficient. The parts are to be organized according the actual family relationships of the user's family.

FIG. 1 shows an example of a family tree structure 1 expanded according to a particular person's extended family. This example displays five generations. For clarity, item numbers falling in the range 10-19 (inclusive) pertain to the first generation, 20-29 pertain to the second generation, and so on up to 50-59, which pertain to the fifth generation. Item numbers 1-9 and 60-99 are not tied to any generation in FIG. 1. Not all of these item numbers are used.

1. First Generation

The trunk 5 is the structural foundation of the display. The earliest ancestor to be included is the first generation of the display. This first generation is represented by a senior heart-shaped picture holder 10 at the base or root of the tree. This picture holder is also called the senior heart 10. Preferably, the senior heart 10 holds a picture of man and wife, the senior couple. The senior heart 10 differs from other hearts by its larger size.

The user of the invention determines the starting point, whether the first generation is the user's grandparent, great grandparent, or the user him or herself, etc. This decision is influenced by what pictures are available.

2. Second Generation

The children of the senior couple are the second generation. Each member of the second generation is represented by a picture holder connected directly to the top 6 of the trunk 5 by a limb 9. Because the second generation is connected directly to the trunk, the branches of these connections resemble the limbs of a tree. Usually, a married member of the second generation will be represented by a heart-shaped picture holder 20-26. If the child never married, a leaf picture holder may be used as shown by leaf 27. An example would be children that died before marriage without producing any offspring. In the example of FIG. 1, hearts 20 and 25 represent members of the second generation who married but produced no offspring of their own. If a child never married but did produce at least one offspring, a love-knot picture holder is used to picture the 2nd generation family member alone, as shown by love knot 28.

Multiple hearts or love knots can appear on a single branch to indicate multiple marriages or to distinguish children born outside of a marriage if desired. For example, if a child of the senior couple produced offspring prior to marriage, a love knot picturing the child alone can be used to indicate the start of a new generation, as shown by love knot 29. The marriage (or second marriage) is shown by a heart 26 picturing the married couple. The second generation family member is thus pictured twice.

3. Third Generation

Hearts 21 through 24 and heart 26 represent second generation family members who married and had children of their own. These children are the third generation and are represented individually by leaves whether they married or not. The individual or couple pictured in heart 21 had nine children, which are represented by the nine leaves on branch 31; those pictured in heart 22 had five children represented by the leaves on branch 32; those pictured in heart 23 had four children represented by the leaves on branch 33; those pictured in heart 24 had five children represented by the leaves on branch 34; and those pictured in heart 26 had five children represented by the leaves on branch 36.

These are also five examples of nuclear family displays. Nuclear family displays are a two generation structure having a heart, branch (not necessarily including any limb portion), and one or more leaves. The leaf above love knot 28 is also a member of the third generation.

4. Fourth Generation

On branch 34, two individuals of the third generation have married and had families of their own. These individuals are represented by leaves 34A and 34B. The manner in which these marriages and families are represented is an important contribution of the current invention. It allows the trunk-bearing three-generation family tree structure as described so far to be expanded to any number of generations. (Likewise, it also allows a trunkless two-generation nuclear family display to be expanded to any number of generations.)

Note that branch 47 (which crosses behind heart 37) is touching or is "grafted" into leaf 34A. Leaf 34A already grows out of branch 34 by its leafstalk, simulative of the way leaves grow in nature. A graft 71 into a leaf is the appearance of a second branch connected to the leaf directly onto the blade instead of via the leafstalk. According to the invention, the basic nuclear family structure can repeat after a graft 71. FIG. 1 shows the nuclear family display of heart 37, branch 47, and leaves 47A and 47B grafted onto leaf 34A. According to the invention, heart 37 represents the marriage of the individual represented by leaf 34A. This heart 37 holds a picture of selectively either the married couple or just the spouse of the individual represented by leaf 34A. If the couple is pictured, then the blood line descendent of senior heart member 10 is pictured twice, once in leaf 34A and once in heart 37. (If this marriage had resulted in no offspring, the structure would terminate with heart 37. Branch 47 would not extend past the periphery of heart 37 near its inward facing point and the remaining structure originating from this branch 47 would not be there.)

Since this marriage did result in two children, represented by leaves 47A and 47B on branch 47, branch 47 extends beyond the periphery of heart 37 on two sides. On one side it is grafted into the spouse's leaf 34A. On the other side the phyllotaxy of leaves 47A and 47B grow from it. A similar structure is grafted onto leaf 34B.

5. Fifth Generation

Leaves 47A, 47B, and those on branch 48 represent forth generation family members. The grafts 71 on leaves 47A and 47B show that these two each have families of their own. The individual represented by leaf 47A is married, as represented by heart 41, and has two children represented by the two leaves on branch 51. The individual represented by leaf 47B is not married but has three children represented by the three leaves on branch 52. The parent of these three children is represented by a love knot picture holder 42. As before, it represents the start of a new generation without indicating marriage. Therefore, a love knot may or may not be a picture holder, as desired by the user. According to the preferred method of practicing the invention, the love knot substitutes for a heart wherever no marriage exists.

The foregoing illustrates one preferred way several generations can be indicated according to the invention. The heart shape is used to indicate marriage and the structure, or relative positions and connections, makes clear who is married to whom. The invention is not restricted to five generations as shown in the example. Another generation always can be added to an existing leaf by grafting in a second branch. This second branch should have a heart or love knot followed by one or more leaves of the new generation. A marriage without children can be added by grafting in a second branch and a heart.

If parents are likely to have more children, an extra length of the branch can left with an open tip 70, as seen on branches 33 and 51. This facilitates growth of the family tree structure 1. If family growth requires it, a short branch can be replaced with a longer one. If it is known that parents will not have any more children, the tip of the appropriate branch may be terminated with a leaf as seen on branches 31, 32, and 47, for example.

Generally, picture holders are used whenever a picture is available. The invention encourages family members to contact one another to obtain pictures. It thus draws families together. Even so, sometimes a photograph is not available from any source. For this reason the invention provides for special heart members, special leaf members, and special love knot members which are not picture holders. They are identical to the corresponding picture holders except that they have no framed opening for displaying a photograph. Instead, they have a solid front. They are to be used sparingly to represent actual individuals not pictured so the unavailability of a picture does not prevent someone from practicing the invention.

FIG. 1 shows optional indicia tags 72 attached to the leaf above love knot 28, leaf 27, and the senior heart 10.

These tags 72 can bear the family member's name and-/or important dates such as birth, death, or marriage dates.

Construction Details of the Preferred Embodiment

The invention can be made with parts that cooperate (mount together) in any number of ways, as will be readily observed by those skilled in the various arts of working with materials. The invention will be further illustrated with details of the most preferred ways it can be constructed. FIG. 2 shows a leaf picture holder 74 as cut or stamped out of metal foil. It is provided to the user in this flat manner. It has a back 75 and a front frame 76 joined at a fold line 77. Along the outside of the frame 76 are several folding tabs 79. The folding tabs are used to hold the back 75 against the frame 76 when the leaf picture holder 74 is folded closed at fold line 77, as shown in FIG. 3.

FIGS. 3 and 4 show a leaf picture holder 74 in use, folded and in greater detail. It has a generally flat blade portion 80 and a leafstalk 81. The leafstalk 81 is also a branch connector 82. The leafstalk's branch connector 82 wraps around an attachment point 84 of a first branch 85A. The leaf 74 holds a photograph 86 supplied by and trimmed to shape by the user. In this embodiment, the blade portion 80 has a border that extends in front the photograph 86 and thus is a frame 76. This frame 76 bears on the photograph 86 and presses it against the back 75. The grip required to hold the photograph 86 is maintained by folding tabs 79.

Two branch mounting tabs 87 are formed out of the back 75, leaving two U-shaped slits 88 (FIG. 2). The width of the slits 88 is exaggerated for clarity. FIGS. 3 and 5 show how branch mounting tabs 87 can be wrapped around a second branch 85B in those instances when it is necessary to have a second branch 85B growing out of (grafted into) a leaf 74 in addition to the first branch 85A.

One of the unique features of the invention is the construction in which a leaf has two branches attached to it. The leaf 74 is attached to a first branch 85A with a leafstalk 81 corresponding to a leafstalk, stem, or petiole that would normally nourish a leaf in nature. The leafstalk 81 connection indicates the ancestor side of the leaf. The other or second branch 85B indicates the spouse and descendent side of the leaf. It is attached to the blade 80 of the leaf 74 as if it were "grafted" in. When this construction is used, the particular location or manner in which the second branch 85B is grafted into the blade 80 is not important. What is important is the fact that the leaf 74 has a leafstalk 81 "naturally" connected to a first branch 85A and an "extra" branch 85B, and it is clearly visible which is which. Preferably, the second branch 85B is constrained to touch the back 75 of the blade 80, but to practice the invention it is enough for the second branch 85B to be attached to the leaf 74 in any manner that clearly distinguishes it from a leafstalk 81. In any case, the second branch 85B extends beyond the periphery of the leaf 74.

FIG. 6 is a selectional view showing how the leafstalk 81 is the top and bottom parts of the branch connector 82 wrapped partially around the branch's attachment point 84.

FIG. 7 shows a branch 91 which can be trimmed and used as a branch or a branch and limb. It has several protruding attachment points 84 to which leaves 74 can be attached. A leaf 74 also can be attached to the tip of a branch as shown on branch 31 in FIG. 1, for example.

The user can remove unused attachment points 84 with a knife or wire cutter.

Figure 8:
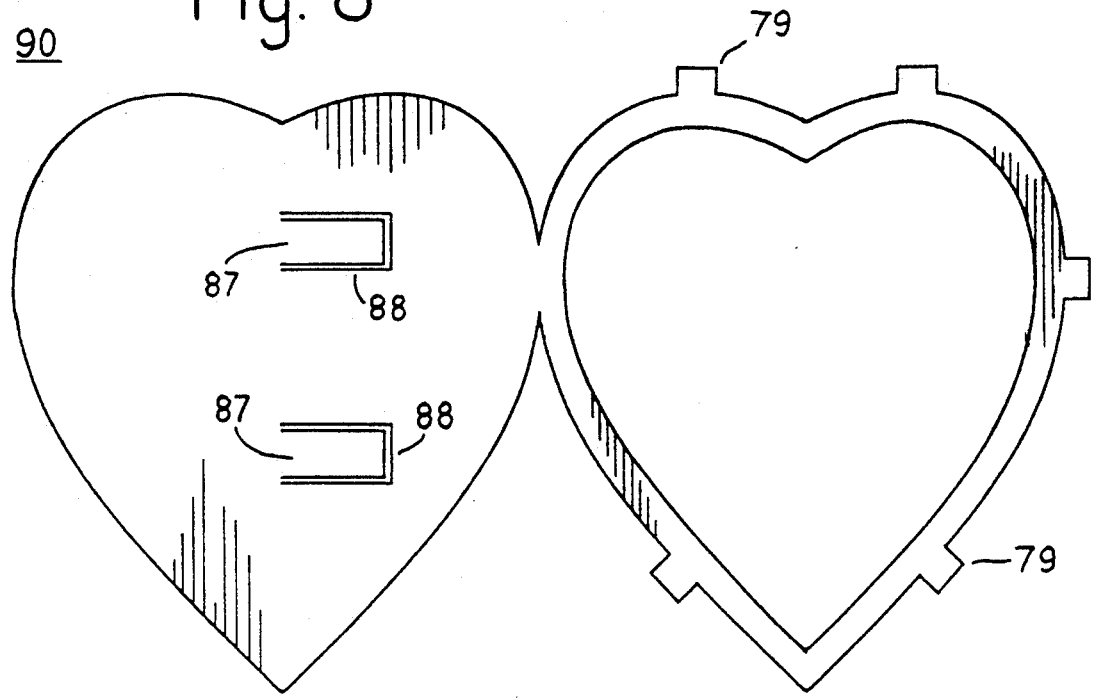
FIG. 8 is a heart-shaped picture holder open flat as provided, according to one embodiment of the invention.
Figure 9:
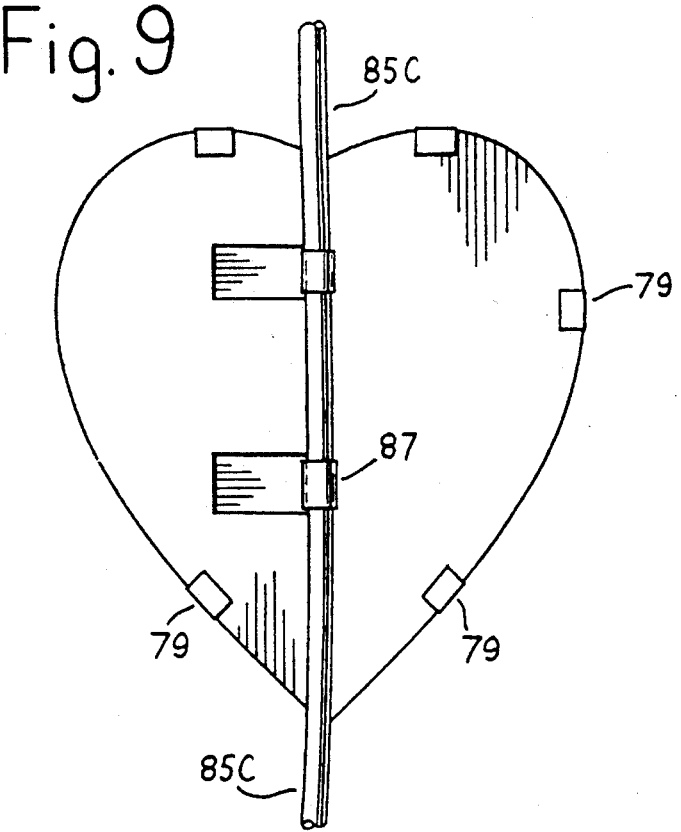
FIG. 9 is a rear view of the heart-shaped picture holder of FIG. 8, folded, with a branch attached, and holding a user-provided picture.

FIG. 8 shows that a heart-shaped picture holder 90, or heart 90, is constructed like a leaf 74 except for its peripheral shape and the absence of a leafstalk 81. The absence of a leafstalk means a heart 90 does not have a leafstalk's inherent branch connector providing for a "naturally" connected first branch. Instead, a heart 90 is attached to a single branch 85C as shown in FIG. 9. A senior heart-shaped picture holder 10 is like a regular heart-shaped picture holder 90 which is enlarged and adapted to being mounted near the root area of a trunk instead of on a branch. It has two spaced horizontal slits (not shown), one above the other at the center of the back, instead of a pair of U-shaped slits. These spaced horizontal slits receive and hold a tab on the trunk.

Figure 10:
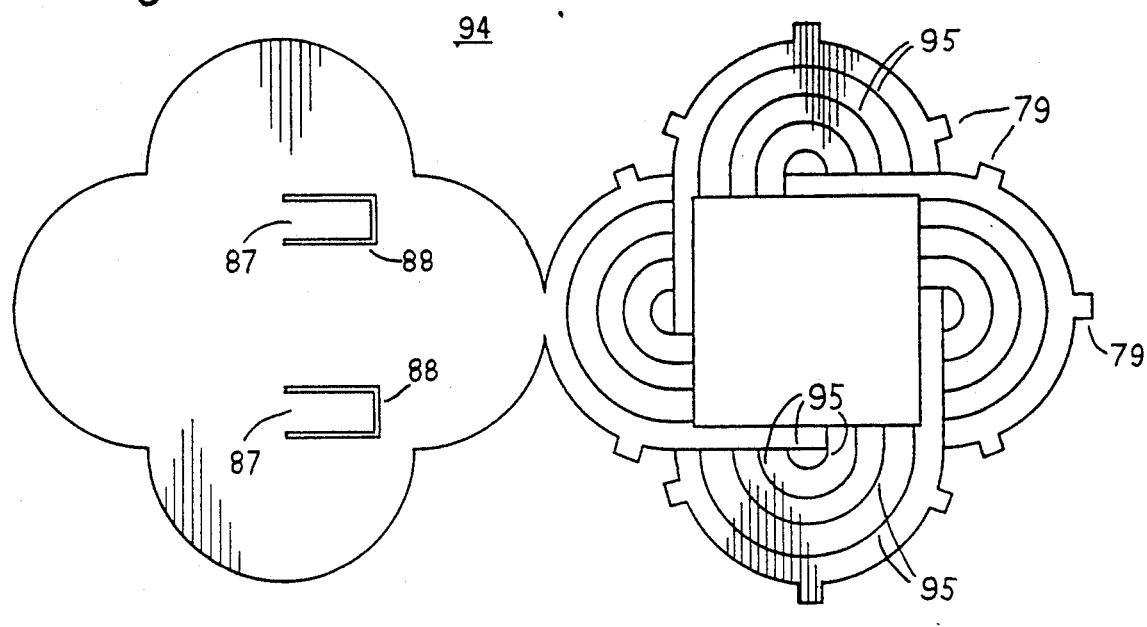
FIG. 10 is a love knot picture holder open flat as provided, according to one embodiment of the invention.
Figure 11:
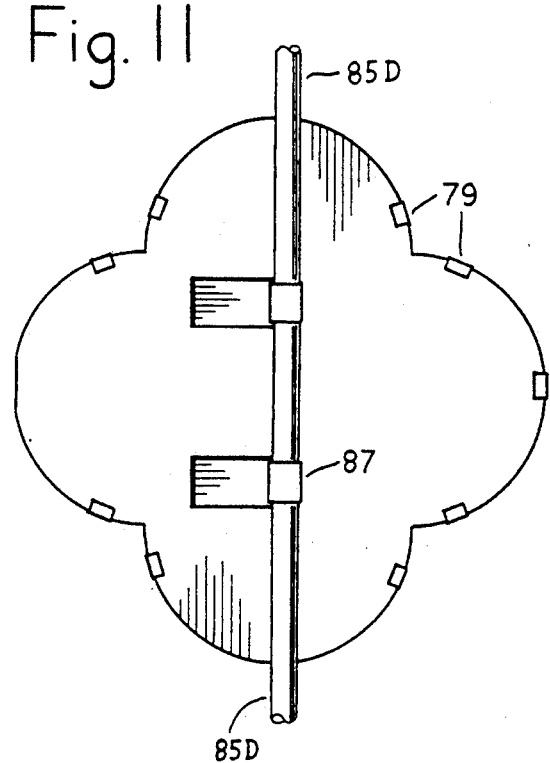
FIG. 11 is a rear view of the love knot picture holder of FIG. 10, folded, with a branch attached, and holding a user-provided picture.

FIGS. 10 and 11 show that a love knot picture holder 94 is structurally similar to a heart-shaped picture holder 90 except the peripheral shape of a love knot distinguishes it from both hearts and leaves. The love knot has four semicircular lobes. The markings 95 are a matter of design and can be printed (as shown) or embossed. The love knot attaches to a single branch 85D just like the heart does.

In the preferred embodiment, the flat parts are stamped out of sheets of a stiff deformable material. Many pure or alloyed metal foils are suitable. The material must be flexible enough to permit folding and bending without breaking. It must also be strong enough to retain its shape before and after bending.

If the leaves are made of a stiff enough material, or are molded in a modified structure so the branch connectors are one piece, the branch connectors on the leaves and the attachment points on branches can be made to cooperate like "pop beads". Then they pop on by applying pressure and pop off by pulling with moderate force. Similar connectors are used on many molded plastic chain-forming toys for small children. Alternatively, the attachment points on the branches could be holes. Then the leafstalks would be inserted into these holes and held with the "pop bead" effect.

The branches 91 can be made of a variety of materials that are flexible or bendable and give sufficient support to the rest of the structure. Braided or twisted wire or injection molded plastic is suitable. Branches could also be made of heavy gauge wire where no attachment points are needed. Preferably, the branches 91 should be made to match the color of the leaves.

The trunk 5 has a front and back which are held together by folding tabs just like the leaf, heart, and love knot members. FIG. 1 shows the construction of the trunk 5 when folded shut. It has limb connectors 93 where branches or limbs can leave the trunk 5. If they are more than just holes for the branches to pass though, then unused limb connectors 93 can be removed or folded down. The branches or limbs 9 may be gathered internally and held with a fastener such as a nylon wire tie. The front of the trunk 5 has a trunk tab (not shown) to allow attachment of a senior heart-shaped picture holder 10. The back of the trunk 5 has a strap (not shown) for engaging a picture hook, nail, or similar mounting device.

The family tree structure is to be mounted to a wall or display panel (not shown) as desired. The main mount will be to the back of the trunk 5. Any branch, leaf or heart not obtaining sufficient strength from regular interconnections should also have its own mount to the rear surface (not shown).

A leaf in nature can take on many different shapes. Some natural leaves are heart-shaped. For clarity, heart shaped leaves should be avoided in the current invention. Nevertheless, a leaf of any shape can be identified as a leaf because it has a blade portion and a leafstalk portion by which the blade is attached to a branch. In other words, the leaf appears to be growing from the branch via its leafstalk rather than only being strapped or glued to a branch. Another distinguishing feature which can identify a group of picture holders as leaves is that they are arranged in a phyllotaxy. A phyllotaxy is a naturally occurring arrangement of leaves around a branch. In contrast, the heart-shaped picture holders all have the peripheral shape of a heart symbol as shown herein and as commonly seen on Valentine's Day. Neither the hearts nor love knots have leafstalks.

All parts of the invention should match in style and size to establish the appearance of a unified structure. Picture holders should match in approximate picture area, except where a large size serves a purpose as previously disclosed. Picture holders of the same kind should match in all border characteristics including peripheral shape. Picture holders of different kinds should match in border characteristics other than peripheral shape. Such characteristics include the border or frame material, color, thickness, width between the picture and periphery, and design, if any. Secondary considerations include matching construction such as folds, tabs, etc. The love knot picture frame is a partial exception in that its border is wider at its four lobes and because it can have an embossed or indicial design. Nevertheless, it can still be made to appear harmonious with the other parts by what they have in common, such as frame width where the lobes meet.

The pictures used can be any likeness of the individuals they represent, whether actual photographs, photocopies of the same, or whatever. Photographs can be enlarged or reduced to fit the appropriate frame size and shape. It is best to plan out the structure in advance to determine the orientation each picture holder takes. Then, each picture is trimmed to its corresponding picture holder's shape and orientation so each likeness is either right side up or has a desirable tilt.

Alternative Constructions

Inclusion of the trunk 5 is preferred, but it does not represent any individual and so the invention can be practiced without a trunk 5. One way of doing this is for several branches or limbs to come directly out of the top of a modified senior heart-shaped picture holder. The modified senior heart-shaped picture holder would have limb connectors along its top edges for these branches or limbs.

The present invention can also be built using other materials and ways of making connections. For example, the various kinds of leaf picture holders, heart-shaped picture holders, love knot picture holders, branches, and trunk can be made out of ceramics, plastic, cloth supported by wire sewn within, silk as found in silk flowers arrangements, hand wrapped silk, or other materials or harmonious combinations of materials. The manner of mounting and making connections will differ for each type of material, as will be apparant to those skilled in the art of working with each material in light of this teaching.

The leaves may take on other shapes. While this is a matter of design, some variations have ramifications for the rest of the invention. In particular, the leafstalk may project away from the plane of the leaf blade by as much as a right angle, thus producing a three dimensional structure. Several such leaves can be attached to the same substantially straight branch. Their front picture displaying surfaces can all face outward to be visible from one spot, even though the branch from which they grow is a distance behind them. The limbs can then grow out of a container like a potted plant, including a hanging potted plant. The hearts and love knots can be attached as in the original structure. Perceiving the family relationships from a three dimensional structure can be more difficult; therefore, the two dimensional structure is preferred.

Alternative Structure for the Kit

Figure 12:
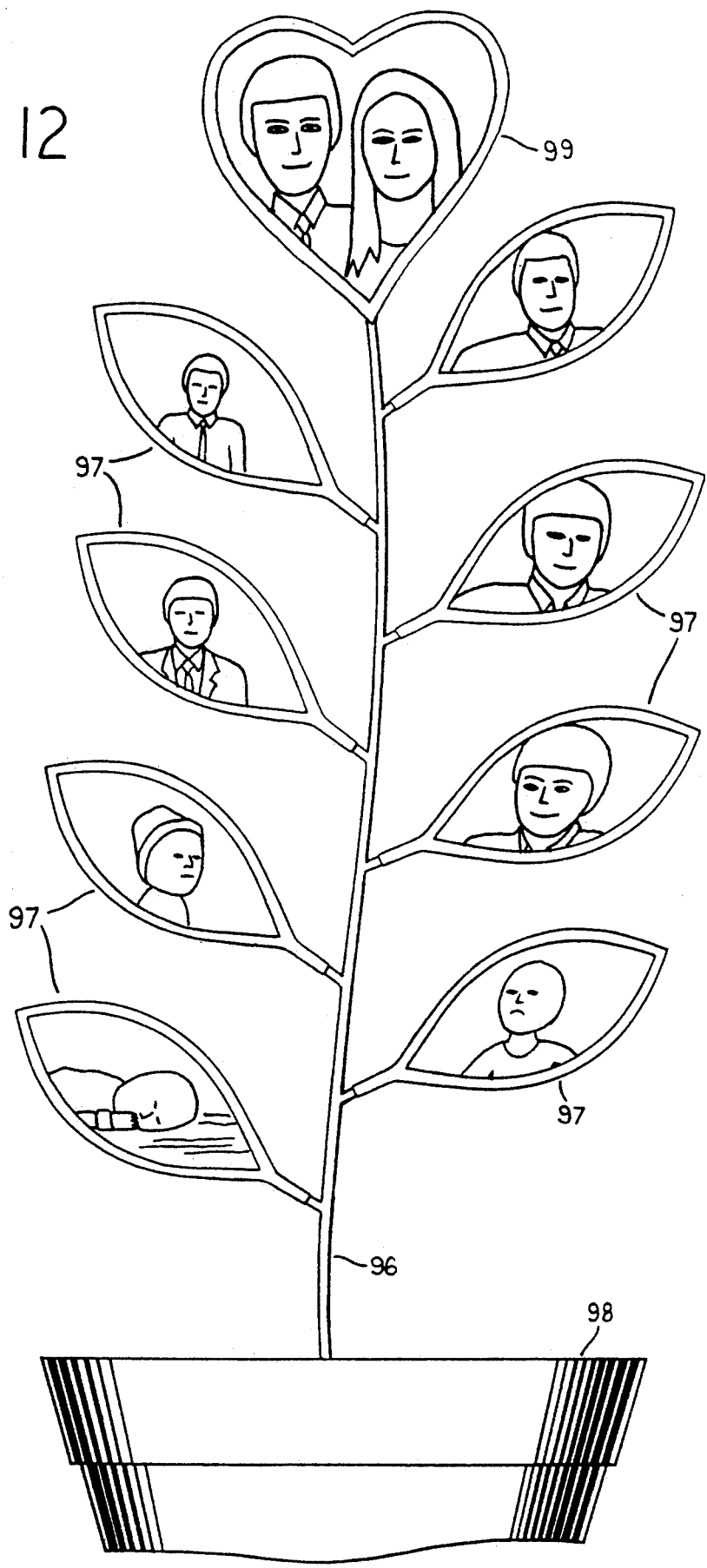
FIG. 12 is an elevation view of another picture arrangement made possible by the kit of the current invention.

FIG. 12 shows an alternative structure which is possible according to the invention. This structure can be made with the same basic kit having one heart-shaped picture holder, one branch, several leaf picture holders and no trunk. Here a single branch 96 bears several leaf picture holders 97 along its length. Each leaf picture holder 97 holds a picture of the same child at a different age, for example, using pictures taken annually by schools. At the bottom of the branch 96 is space for an optional name tag (not shown), which also could bear the child's birth date. At the top end of the branch 96 is a heart-shaped picture holder 99 holding a picture of the child's spouse or the two of them together If this structure is manufactured secure enough to be self-supporting in three-dimensions, it can be mounted on a user-provided base such as a flower pot 98, as shown, or arranged in a vase (not shown) (Otherwise, it can be mounted on a flat surface.) Similar arrangements for other children of the same couple can also be "grown" from the same flower pot or vase. Optionally, a picture of the parents in a heart frame can be attached to the front of the flower pot.

The preferred and alternative methods of practicing the invention can be combined. Referring back to FIG. 1, the limbs represent children too. Therefore, a leaf can be grown sideways from the limb, between the trunk and the first heart or love knot. This leaf is for a photograph of the child of the senior couple before marriage (such a leaf is not shown in FIG. 1).

Since the various pieces of the invention form a kit of cooperating parts, some users of the kit may wish to depart from the teaching herein. They may invent their own structures or meanings for the structures. Such flexibility is made possible by the unique connectivity of the matching yet specialized pieces. The invention therefore is also a tool for allowing users to be creative and express themselves with their pictures.

The foregoing description of the preferred embodiments of the invention has been presented for the purposes of illustration and description. Many modifications and variations thereof will present themselves to those skilled in the art without departure from the scope and spirit of the invention. Therefore, the invention is not limited to the embodiments and examples shown, but by the limitations defined in the appended claims.

I claim:

1. An expandable modular picture holder kit for displaying a plurality of pictures of related persons, said kit comprising in combination:
   (a) at least one branch, said branch comprising an elongated member;
   (b) a plurality of leaf picture holders, each said leaf picture holder comprising a leafstalk and a blade growing extending from said leafstalk, said blade including a front and a back and means on said front for displaying a picture, said leafstalk including first attachment means for attaching said leafstalk selectively along the length of said branch; and (c) at least one heart-shaped picture holder, said heart-shaped picture holder comprising a front and a back and a periphery in the shape of a heart and means on said front for displaying a picture and second attachment means on said back for attaching the back of said heart-shaped picture holder to said branch;

whereby said kit can be assembled into any one of a number of possible arrangements all having said heart-shaped picture holder and said plurality of leaf picture holders interconnected with said branch.

2. The kit of claim 1 additionally comprising a plurality of additional leaf picture holders, each said additional leaf picture holder comprising a leafstalk and a blade extending from said leafstalk, said blade including a front and a back and means on said front for displaying a picture, said leafstalk including first branch connector means for attaching said additional leaf picture holder selectively somewhere on said branch and each said additional leaf picture holder further comprising a second branch attachment means for attaching a second branch to said additional leaf picture holder on the blade portion of said additional leaf picture holder and extending said second branch beyond the periphery of said additional leaf picture holder.

3. The kit of claim 1 wherein at least some of said leaf picture holders each additionally comprises a second attachment means for attaching a second branch to said leaf picture holder on the blade portion of said leaf picture holder and extending said second branch beyond the periphery of said leaf picture holder.

4. The kit of claim 1 wherein said front of each said heart-shaped picture holder is a frame and all the frames of said heart-shaped picture holders are substantially of the same width and design and peripheral shape, and further wherein said front of each said leaf picture holder is a frame and all the frames of said leaf picture holders are substantially of the same width and design and peripheral shape, and further wherein the frames of said heart-shaped picture holders and the frames of said leaf picture holders are substantially of the same width and design but of substantially different and distinguishable peripheral shapes.

5. The kit of claim 1 wherein said branch further comprises a plurality of attachment point means spaced at regular intervals along the length of said branch from one end of said branch.

6. The kit of claim 1 additionally comprising a trunk simulative of a tree trunk, said trunk having a front, back, top, and bottom; said trunk comprising a plurality of means along said top for selectively attaching a plurality of branches and extending said branches beyond said trunk.

7. The kit of claim 1 wherein said back of said heart-shaped picture holder is attached to said branch and said branch extends beyond the periphery of said heart-shaped picture holder on substantially opposite first and second sides, and said plurality of leaf picture holders are attached by their leafstalks to selected locations along the length of said branch, all of said leaf picture holders attached to a portion of said branch that is to said first side of said heart-shaped picture holder, whereby said kit as assembled is called a nuclear family assembly.

8. The kit of claim 7 wherein said heart-shaped picture holder displays the likeness of between one and two individuals who are parents and said leaf picture holders each display the likeness of an individual who is a child of said one or two parents, whereby said kit as assembled with likenesses of a nuclear family is called a nuclear family display.

9. The kit of claim 7 additionally comprising a trunk simulative of a tree trunk and an additional heart-shaped picture holder, said trunk including means along its top for attaching a plurality of said nuclear family assemblies.

10. The kit of claim 9 wherein said plurality of nuclear family assemblies each display the likenesses of a nuclear family and said additional heart-shaped picture holder displays the likeness of at least one individual who is a parent, and each of the heart-shaped picture holders of said plurality of nuclear family assemblies display a likeness of an individual who is a child of said parent.

11. The kit of claim 7 additionally comprising a second branch and a second heart-shaped picture holder mounted on said second branch, said second branch also mounted onto the back of the blade of one of said leaf picture holders.

12. The kit of claim 11 wherein said nuclear family assembly displays the likenesses of a nuclear family and said second heart-shaped picture holder displays the likeness of the spouse of the child whose likeness is displayed by said leaf picture holder on which said second branch is mounted.

13. The kit of claim 7 additionally comprising a plurality of additional nuclear family assemblies, wherein said second side of said branch of each said additional nuclear family assembly is mounted to the back of the blade of a leaf of the first said nuclear family assembly.

14. The kit of claim 13 wherein said nuclear family assembly and said additional nuclear family assemblies each display the likenesses of a nuclear family and the heart-shaped picture holder of each said additional nuclear family assembly displays the likeness of at least the spouse of the individual whose likeness is displayed in the leaf picture holder to which it is mounted on the blade.

15. A kit comprising:

(a) first and second pluralities of nuclear family assemblies, each nuclear family assembly of said first and second pluralities of nuclear family assemblies as recited in claim 7;

(b) an additional heart-shaped picture holder;

(c) a trunk including a top and a front, said additional heart-shaped picture holder attached to the front of said trunk;

(d) each of said second sides of said branches of said first plurality of nuclear family assemblies attached to the top of said trunk; and (e) each of said second sides of said branches of said second plurality of nuclear family assemblies attached selectively to the back of the blade of a different one of said leaves of a nuclear family assembly selected from said first and second pluralities of nuclear family assemblies.

16. The kit of claim 15 wherein each nuclear family assembly of said first and second plurality of nuclear family assemblies display the likeness of a nuclear family and said additional heart-shaped picture holder displays the likeness of at least one individual who is a parent, and each of the heart-shaped picture holders of said first plurality of nuclear family assemblies display a likeness of an individual who is a child of said parent, and the heart-shaped picture holder of each said nuclear family assembly of said second plurality of nuclear family assemblies displays the likeness of at least the spouse of the individual whose likeness is displayed in the leaf picture holder to which it is mounted on the blade.

17. The kit of claim 1 wherein said front of each said picture holder is a frame constructed of metal foil and said frame additionally comprises a plurality of foldable tabs spaced around said periphery of said frame and further wherein said back of each said picture holder is a panel constructed of metal foil, said frame and said panel having substantially the same periphery when said folding tabs are folded around said panel and are gripping said panel.

18. The kit of claim 1 wherein each said picture holder includes a panel constructed of metal foil and at least one U-shaped slit cut in said panel and at least one rollable tab formed by said U-shaped slit, said rollable tab being accessible from said back and being sufficiently long and strong to wrap around and hold one of said branches.

19. The kit of claim 1 additionally comprising a love knot picture holder, said love knot picture holder including a front and a back and a periphery in the shape of a square extended by four semicircular sides.

20. The kit of claim 1 wherein each of said leaf picture holders additionally comprises a second branch attachment means for attaching a second branch to said leaf picture holder on the blade portion of said leaf picture holder and for extending said second branch beyond the periphery of said leaf picture holder.

* * * * *